United States Patent [19]
Hamma

[11] Patent Number: 6,119,525
[45] Date of Patent: *Sep. 19, 2000

[54] PRESSURE GAUGE HAVING DAMPENER MECHANISM

[75] Inventor: John C. Hamma, Isle of Palms, S.C.

[73] Assignee: Dresser Industries, Inc., Dallas, Tex.

[*] Notice: This patent issued on a continued prosecution application filed under 37 CFR 1.53(d), and is subject to the twenty year patent term provisions of 35 U.S.C. 154(a)(2).

[21] Appl. No.: 09/080,071

[22] Filed: May 15, 1998

Related U.S. Application Data

[60] Provisional application No. 60/052,363, Jul. 11, 1997, and provisional application No. 60/067,571, Dec. 5, 1997.

[51] Int. Cl.[7] .................................................. G01L 7/04
[52] U.S. Cl. .............................................. 73/739; 73/741
[58] Field of Search .............................. 73/707, 732, 739, 73/741

[56] References Cited

U.S. PATENT DOCUMENTS

| | | | |
|---|---|---|---|
| 1,664,776 | 4/1928 | Heise | 73/739 |
| 1,874,765 | 8/1932 | Lammeree | 73/739 |
| 2,701,968 | 2/1955 | Brown | 73/739 |
| 2,796,765 | 6/1957 | Huston | 73/739 |
| 3,335,609 | 8/1967 | Nelson | 73/739 |
| 3,633,535 | 1/1972 | Puster | 116/129 R |
| 4,100,812 | 7/1978 | Gray et al. | 73/732 |
| 4,413,523 | 11/1983 | Claxton et al. | 73/701 |
| 4,413,524 | 11/1983 | Hosh | 73/707 |
| 5,644,074 | 7/1997 | Huang | 73/146.8 |

FOREIGN PATENT DOCUMENTS

| | | | |
|---|---|---|---|
| 974081 | 9/1975 | Canada | 73/741 |

*Primary Examiner*—Eric S. McCall
*Assistant Examiner*—Abdullahi Aw-musse
*Attorney, Agent, or Firm*—Daniel Rubin

[57] ABSTRACT

Dampening apparatus for a pressure gauge in which a short length of sleeve, ferrule, hub or thimble encircles the pointer shaft in a close but loose fit relation and is packed with a high viscosity fluid such that it will serve to decelerate and cushion any sudden shock or pulsation force that would otherwise be transmitted to the pointer shaft.

18 Claims, 2 Drawing Sheets

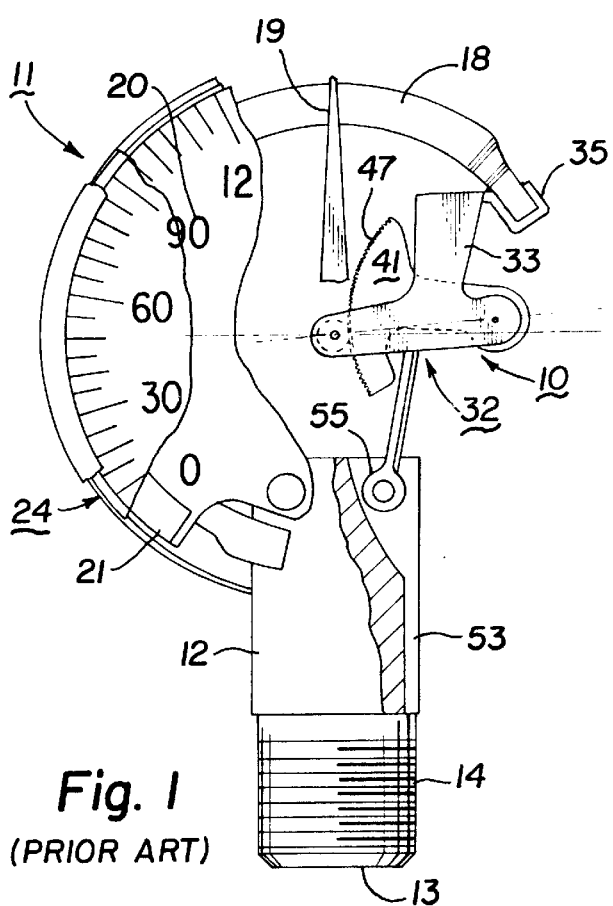
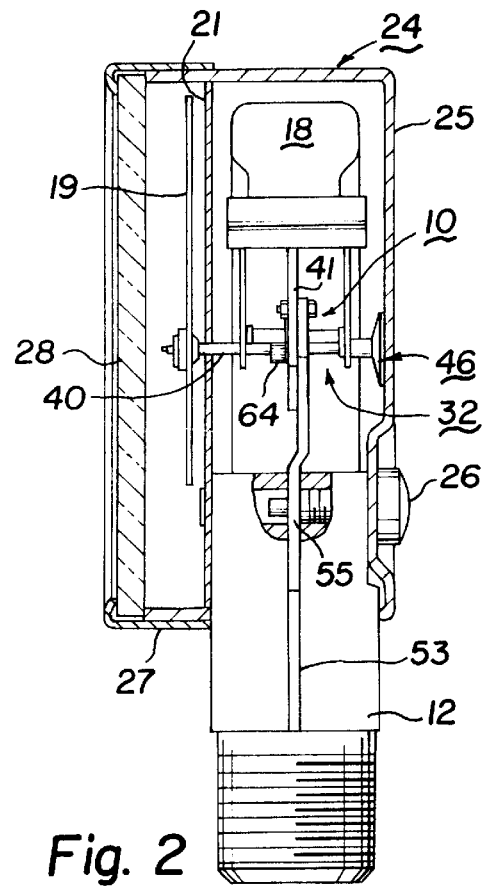
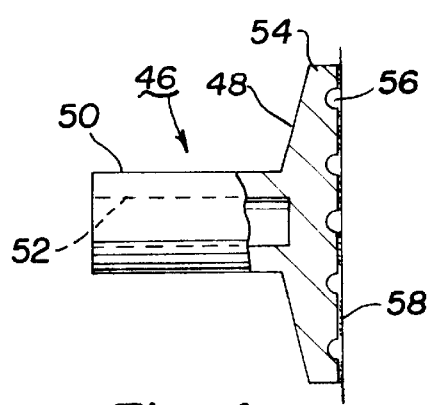
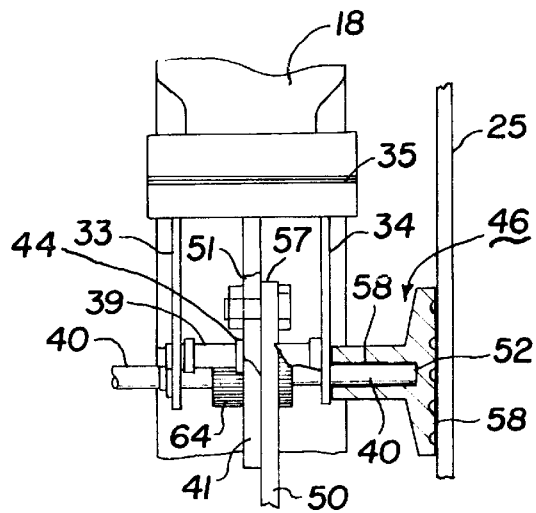
Fig. 1 (PRIOR ART)
Fig. 2
Fig. 4
Fig. 3

PRESSURE GAUGE HAVING DAMPENER MECHANISM

This application claims the benefit of prior filed co-pending U.S. Provisional Application No. 60/052,363, filed Jul. 11, 1997 and prior filed co-pending U.S. Provisional Application No. 60/067,571 filed Dec. 5, 1997.

FIELD OF THE INVENTION

The field of art to which the invention pertains comprises pressure gauges having a dampener operative to avoid transmitting shock pulsation or vibration forces from the condition sensitive element to the output indicia.

BACKGROUND OF THE INVENTION

Pressure gauges are widely utilized in a myriad of different environments for commercial and industrial applications where measuring and indication of fluid pressure values is required. Values of pressure are usually displayed by a pointer in analog form. The primary sensing element of the gauge typically comprises a Bourdon tube having a free end that incurs a predictable displacement in response to pressure changes to which it is exposed. Typically, tube displacement is translated via a movement or amplifier to a rotatable pointer that is displaced opposite a dial of calibrated pressure values.

The gauge movement impresses the extent of tube deflection upon the indicator element which registers the value of force, pressure or condition. For accurate measurement, the responsive element must not be only sensitive to very small changes in value of the forces of pressures measured, but the deflection of the condition responsive element in response to such changes must be sufficiently minute that the indicator will legibly register a precise change in value. Accordingly, when the force or pressure to be measured is subject to rapid or violent pulsations, it can cause the gauge movement and indicator to vibrate or fluctuate. Under these conditions it is very difficult to measure accurately the average mean or peak value of the source as a result of the pulsations being impressed on the condition responsive element. Such vibration makes reading of the gauge difficult and may even cause misalignment of parts, thereby necessitating frequent readjustment. Moreover, it tends to result in excessive strain and wear on the gauge elements, thereby reducing the expectant life of the gauge.

BACKGROUND OF THE PRIOR ART

The use of dampeners in gauges are well known as exemplified by the disclosures of U.S. Pat. Nos. 1,664,776; 1,874,765; 2,701,968; 2,796,765 3,335,609; 4,100,812 and 4,413,523. Thus, while various constructions of gauge dampeners are known, they tend to be of relatively complex construction and therefore relatively costly. Another approach has been to liquid fill the case, but this has proven to be expensive, heavy and troublesome with associated leakage and disposal problems.

Despite recognition of the foregoing, a much simpler and more economically feasible construction of gauge dampener has heretofore been unknown.

OBJECTS OF THE INVENTION

It is an object of the invention to provide a novel dampener construction for gauges to dampen undesirable vibration fluctuation forces internally imposed on the gauge.

It is a further object of the invention to effect the previous object with a construction that is economically advantageous compared with previous constructions utilized for that purpose.

It is a still further object of the invention to effect the previous objects with a dampener that functions in a highly efficient manner and yet is substantially maintenance free.

SUMMARY OF THE INVENTION

This invention relates to pressure gauge apparatus including novel dampener apparatus for eliminating the adverse effects of pulsation, and vibration forces, and the like received by the gauge. More specifically, the invention relates to such a dampener in a pressure gauge that is operative to absorb shock pulsation or vibration forces against being transmitted from the output of the condition responsive element to the output indicia of the gauge, commonly in the form of a pointer opposite a dial plate.

The foregoing is achieved in accordance herewith by means of a close fitting, lubricant packed sleeve, ferrule, thimble, hub, cup, etc. of metal or plastic situated on the pointer shaft of the gauge. In a first embodiment, a T-shaped hub including an elongated shank is integrally secured to an end disc. The shank includes a central elongated bore in which to receive an extended end portion of the pointer shaft to be dampened and is sized to afford a loose but controlled clearance fit thereabout. Concomitantly, the disc is positioned against the interior face of the gauge housing in a lubricant cushioning relation with a layer of silicone lubricant therebetween to be described.

In a second embodiment, a floating lubricant cup or the like, preferably in the form of a ferrule of metal or plastic, is situated at an intermediate location on the pointer shaft. To achieve the desired dampening effect the floating ferrule encircles the shaft so as to afford a controlled clearance about the shaft and is similarly packed with a lubricant fluid of selected viscosity.

In a third embodiment, the dampener is formed of a hub of metal or plastic surrounding the pointer shaft between the pinion gear and the back face of the dial plate. A quantity of silicone lubricant, as before, is placed between the hub and the juxtaposed surfaces thereabout. Unlike the previous embodiments, this embodiment does not require any modification to the basic gauge construction.

The shaft receiving bore of each embodiment affords a controlled clearance relative to the received support shaft of between about 0.002 inches–0.030 inches with about 0.008 inches being optimum. The lubricant pack is characterized by a viscosity range of an oil from about 1 million centistokes to a grease consistency number of 144 per ASTM D 1403 (¼ scale cone penetration test). Optimum consistency is about number 190.

Any surrounding structures afford outside clearance of between about 0.009 inches–0.051 inches with an optimum of about 0.017 inches that is similarly packed with lubricant.

By virtue of a relatively simple construction, satisfactory dampening in a pressure gauge can be obtained without the complexity normally associated with dampener constructions of the prior art.

The above noted features and advantages of the invention as well as other superior aspects thereof will be further appreciated by those skilled in the art upon reading the detailed description that follows in conjunction with the drawings.

BRIEF DESCRIPTION OF THE DRAWINGS

FIG. 1 is a front elevation of a pressure gauge of the prior art;

FIG. 2 is a sectional elevation of the gauge of FIG. 1 modified to incorporate the first embodiment dampener in accordance with the invention;

FIG. 3 is an enlarged fragmentary elevation of the dampener installation of FIG. 2;

FIG. 4 is a still larger showing of the dampener unit for the embodiment of FIGS. 2 and 3;

DESCRIPTION OF THE PREFERRED EMBODIMENT

Figure 5:
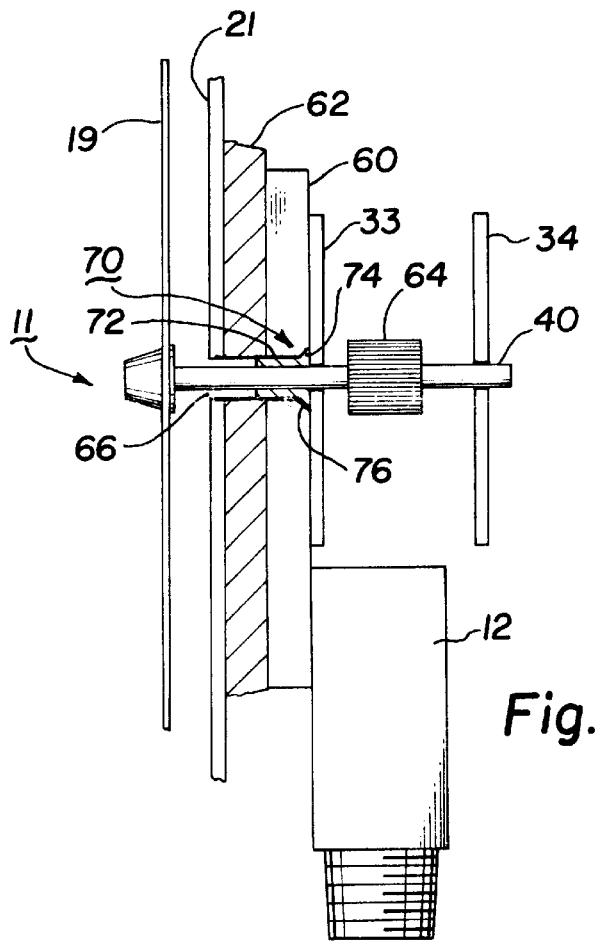
FIG. 5 is fragmentary enlarged elevation showing the dampener of the second embodiment hereof.

In the description which follows, like parts are marked throughout the specification and drawings with the same reference numerals respectively. The drawing figures are not necessarily to scale and in certain views, parts may have been exaggerated for purposes of clarity.

Referring now to the drawings, there is illustrated in FIG. 1 a pressure gauge designated 11 that may for example, be of a type disclosed in U.S. Pat. No. 4,055,085 incorporated herein by reference. The instrument includes an amplifier 10, a stem or socket 12 in which fluid pressure to be monitored is received at an inlet 13 and includes threads 14 for connecting the gauge to a system with which it is to be employed. Fluid pressure received at inlet 13 is communicated to a Bourdon tube 18 that is subject to arcuate motion displacement in a well known manner in response to incremental pressure changes received at inlet 13.

The motion of Bourdon tube 18 is conducted to amplifier 10 to produce an amplified and correlated motion for operating a pointer 19 relative to pressure values 20 on dial face 21. Except for stem 12, each of the foregoing components comprise the operating mechanism that is substantially contained within enclosed housing 24. The housing consists of a cup shape shell-like backing 25 secured via screws 26 to stem 12 and bezel 27 telescopically fit onto backing 25 to secure a crystal 28 for viewing the pointer position relative to pressure values 20 on face 21.

Amplifier 10, as best seen in FIGS. 2 and 3, includes a centrally upright U-shaped carriage or frame 32 integrally formed to include symetrically spaced apart side legs 33 and 34. Frame 32 is preferably of a hard metal such as brass and of a relatively thin cross section. Bracket 35 is permanently secured to the end of the Bourdon tube as by welding, soldering, brazing or the like.

Installed between carriage legs 33 and 34 are a pair of longitudinally displaced rotatable shafts 39 and 40. Shaft 39 provides a hinge support for a geared sector arm 41 secured thereto as by staking at 44 while shaft 40 represents the output drive shaft supporting pointer 19. Rotation of shaft 40 for positioning pointer 19 is effected by pinion 64 secured thereto and meshing with sector gearing 47 of arm 41.

To effect dampening in accordance herewith in order to offset any sudden shock, pulsation or vibration forces as might otherwise be transmitted from the Bourdon tube 18 to pointer 19, there is provided in accordance with the first embodiment of the invention a dampener, designated 46, as best seen in FIGS. 3 and 4. Dampener 46 is essentially of a T-shaped hub disc configuration comprising an integral body 48 including a sleeved shank 50 having a bore 52 adapted to closely but loosely fit about extended pinion shaft 40 received therein. The integral disc portion is designated 54 and includes on its rear surface a plurality of grooves or recesses 56 adapted to receive a quantity of high viscosity silicone lubricant 58. The intervening lubricant forms a cushioning layer between the back surface of disc 54 and the interior face of housing wall 25 thereat.

Bore 52 provides a relatively loose fit about shaft 40 on the order of about 0.002 inches to 0.030 inch clearance with a preferred range being on the order of about 0.006 inches–0.015 inches. The available clearance surrounding the shaft end is packed with a high viscosity fluid such as silicone oil having a viscosity of about between 1 million centistokes to a grease consistency number 144 per ASTM D 1403 with optimum being a consistency number of 190. Below about 1 million, the lubricant consists largely of silicone oil at which minimal, if any, dampening can occur. At and above viscosity consistencies of number 144, excessive dampening is incurred. In this arrangement, the lubricant packed bore acts as a dampener for any sudden impulsive rotation otherwise destined for the pointer shaft 40 while the back side of disc 54 essentially seats or floats against a silicone cushion on the interior back face of the housing.

Figure 6:
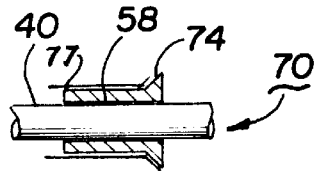
FIG. 6 is an enlarged fragmentary view of the dampener installation of FIG. 5.

In a second and preferred embodiment in accordance herewith, as best seen in FIGS. 5 and 6, the pressure gauge 11 includes similar components as above and further includes a back plate 60 and a case wall 62. Pinion shaft 40 extends through aperture 66 enabling pinion 64 on shaft 40 to drive pointer 19. Dampener 70, for this embodiment, is comprised of a tubular ferrule 72 that is flared outwardly at its rear 74 for interfitting with chamfer 76 at the entrance of back plate 60 to aperture 66. As before, the ferrule provides a loose fit with clearances as stated above while a surrounding clearance 77 is provided in back plate 60, case wall 62 and chamfer 76 of about 0.009 inches to about 0.051 inches. All surrounding and internal clearances are then packed with a high viscosity fluid having viscosity in the ranges stated above. The ferrule in this arrangement operates as a shear mechanism immersed in a body of lubricant.

Figure 7:
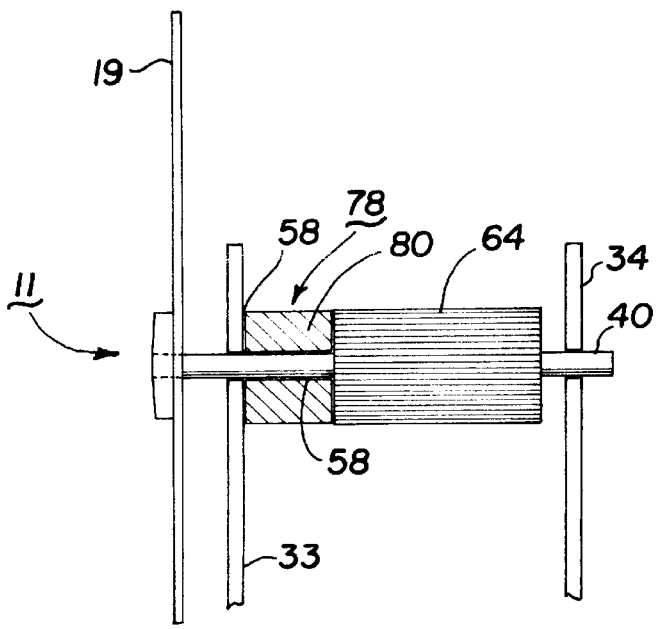
FIG. 7 is a fragmentary elevation showing the dampener of the third embodiment hereof.

For the third embodiment hereof, as best seen in FIG. 7, the dampener 78 is comprised of a hub 80 situated on pointer shaft 40 intervening between the side face of pinion 64 and the backside of side leg 33. As before, the hub provides a loose fit with the stated clearances being lubricant packed with a high viscosity fluid having viscosity in the ranges noted supra.

Pinion 64 and hub 78 are of substantially the same diameter. The hub arcuately displaces with the pinion placing the opposing side faces of the pinion and hub in the aforementioned shear, nonstationary, relation. Preferably, the lubricant cushioned pinion engagement with the hub and the lubricant cushioned hub engagement against plate 33 should be about equal. Unlike the previous embodiments, this embodiment does not require any structural modification to the gauge per se.

By the above description there is disclosed novel and simple constructions for dampening the adverse effects of shock and vibration that might otherwise cause fluctuations in the positioning of pointer 19. By relatively simple and expedient constructions utilizing the simplest of components, an otherwise adverse problem encountered in the operation of such pressure gauges is readily and inexpensively overcome.

Since many changes could be made in the above construction and many apparently widely different embodiments of this invention could be made without departing from the scope thereof, it is intended that all matter contained in the drawings and specification shall be interpreted as illustrative and not in a limiting sense.

What is claimed is:

1. In a pressure gauge including a fluid inlet at which to receive fluid of which the value of pressure is to be monitored, a pressure sensitive element responsive to changes in pressure values of the fluid received at said inlet and an indicator supported on an arcuately displaceable shaft and operative by said pressure sensitive element for providing indicia of the value of pressure being received, a dampener for suppressing undesirable vibration force in the received fluid from being transmitted to said indicator, said dampener being contained in an open relation within said gauge and comprising:

a body supported on said indicator shaft for displacement therewith and positioned opposite a juxtaposed substantially fixed surface thereat; and a packing of lubricant of predetermined viscosity positioned selectively intervening at least between said body and said contiguously juxtaposed substantially fixed surface for effecting a thin cushioning layer of lubricant therebetween.

2. In a pressure gauge in accordance with claim 1 in which said pressure sensitive element comprises a Bourdon tube, said indicator comprises a pointer displaceable opposite a dial plate containing pressure values with which said indicator can register and there is included an amplifier operatively positioned intervening between the output of said Bourdon tube and the support shaft of said pointer.

3. In a pressure gauge in accordance with claim 2, in which said dampener body is of a formation selected from the group consisting essentially of a sleeve, a ferrule, a thimble, a hub, and a cup.

4. In a pressure gauge in accordance with claim 1 in which said indicator comprises a pointer and the clearance between the body bore and received pointer shaft is on the order of 0.002 inches–0.030 inches.

5. In a pressure gauge in accordance with claim 4 in which said packing is subject to a shear force in the course of said pointer shaft being displaced.

6. In a pressure gauge in accordance with claim 1 in which said packing imposes an engaging force of value between said hub and said pinion gear substantially the same as an engaging force value imposed by said packing between said hub and the fixed surface of said amplifier.

7. In an apparatus for effecting displacement between parts in response to a force being transmitted, a dampener contained in an open relation within said apparatus and including:

an operative part arcuately displaceable in response to the force being transmitted;

a fixed surface supported in a contiguously juxtaposed relation to said part so as to define a closely controlled spacing therebetween; and a quantity of lubricant of predetermined viscosity selectively packed into said spacing for suppressing undesirable vibration in the force being transmitted.

8. Apparatus for transmitting motion between an inlet mechanism at which an input force is received and an outlet mechanism at which said received input force is utilized comprising:

an inlet mechanism at which to receive an input force for inducing a motion in response thereto;

an outlet mechanism operatively responsive to motion received from said inlet mechanism;

an intermediate mechanism operable in a path of transmission for transmitting said induced motion from said inlet mechanism to said outlet mechanism and including an arcuately displaceable shaft operably contained in the transmission path of said motion;

a dampener for suppressing undesirable vibration in the motion being transmitted, said dampener being contained in open relation within said apparatus and including a body supported on said shaft for displacement and positioned opposite a contiguously juxtaposed substantially fixed surface thereat; and a packing of lubricant of predetermined viscosity positioned selectively intervening at least between said body and said substantially fixed surface for effecting a cushioning layer of lubricant therebetween.

9. Apparatus according to claim 8 in which said cushioning layer comprises a film of lubricant.

10. In a pressure gauge including a fluid inlet at which to receive fluid of which the value of pressure is to be monitored, a pressure sensitive element responsive to changes in pressure values of the fluid received at said inlet and a pointer indicator supported on an arcuately displaceable shaft and operative by said pressure sensitive element for providing indicia of the value of pressure being received, a dampener for suppressing undesirable vibration force in the received fluid from being transmitted to said indicator, said dampener comprising:

a body supported on said indicator shaft for displacement therewith and positioned with an end disc opposite a contiguously juxtaposed substantially fixed surface thereat; said body comprising a T-shaped hub including an internal tubular bore in which to receive a portion of said indicator shaft with a defined clearance therebetween on the order of 0.002 inches–0.030 inches; and a packing of lubricant of predetermined viscosity positioned selectively intervening at least between said body and said contiguously juxtaposed substantially fixed surface and between said body bore and said received shaft portion for effecting a cushioning layer of lubricant therebetween while being subject to a shear force in the course of said pointer being displaced.

11. In a pressure gauge including a fluid inlet at which to receive fluid of which the value of pressure is to be monitored, a pressure sensitive element responsive to changes in pressure values of the fluid received at said inlet and a pointer indicator supported on an arcuately displaceable shaft and operative by said pressure sensitive element for providing indicia of the value of pressure being received, a dampener for suppressing undesirable vibration force in the received fluid from being transmitted to said indicator, said dampener comprising:

a body supported on said indicator shaft for displacement therewith and positioned opposite a contiguously juxtaposed substantially fixed surface thereat; said body comprising a tubular ferrule located at an intermediate location in a floating relation on said pointer shaft with a defined clearance on the order of 0.002 inches–0.030 inches therebetween;

a packing of lubricant of predetermined viscosity positioned selectively intervening at least between said body and said contiguously juxtaposed substantially fixed surface and between said tubular ferrule and said received shaft portion for effecting a cushioning layer of lubricant therebetween while being subject to a shear force in the course of said pointer being displaced.

12. In a pressure gauge including a fluid inlet at which to receive fluid of which the value of pressure is to be monitored, a pressure sensitive element responsive to changes in pressure values of the fluid received at said inlet and a pointer indicator supported on an arcuately displaceable shaft and operative by said pressure sensitive element for providing indicia of the value of pressure being received, a dampener for suppressing undesirable vibration force in the received fluid from being transmitted to said indicator, said dampener comprising:

a body comprising a tubular hub supported at an intermediate location on said indicator shaft for displacement therewith and spaced at a defined clearance therebetween on the order of 0.002 inches–0.030 inches;

a pinion gear on said pointer shaft juxtaposed at said defined clearance to one end of said hub and displaceable concomitantly with said shaft;

a packing of lubricant of predetermined viscosity positioned selectively intervening at least between said body and said shaft and between said one end of said hub and a face of said pinion gear for effecting a cushioning layer of lubricant therebetween while being subject to a shear force in the course of said pointer being displaced.

13. In a pressure gauge including a fluid inlet at which to receive fluid of which the value of pressure is to be monitored, a pressure sensitive element responsive to changes in pressure values of the fluid received at said inlet and an indicator supported on an arcuately displaceable shaft and operative by said pressure sensitive element for providing indicia of the value of pressure being received, a dampener for suppressing undesirable vibration force in the received fluid from being transmitted to said indicator, said dampener comprising:

a body supported on said indicator shaft for displacement therewith and positioned opposite a contiguously juxtaposed substantially fixed surface thereat; and a packing of lubricant of viscosity in the range of between an oil of about one million centistokes and a grease consistency number of 144 per ASTM D 1403 positioned selectively intervening at least between said body and said contiguously juxtaposed substantially fixed surface for effecting a cushioning layer of lubricant therebetween.

14. In a pressure gauge including a fluid inlet at which to receive fluid of which the value of pressure is to be monitored, a pressure sensitive element responsive to changes in pressure values of the fluid received at said inlet and an indicator supported on an arcuately displaceable shaft and operative by said pressure sensitive element for providing indicia of the value of pressure being received, a dampener for suppressing undesirable vibration force in the received fluid from being transmitted to said indicator, said dampener being contained in an open relation within said gauge and comprising.

a body including an internal tubular bore in which to receive a portion of said indicator shaft on which said body is loosely supported for displacement therewith and positioned opposite a contiguously juxtaposed substantially fixed surface thereat; and a packing of lubricant of predetermined viscosity positioned selectively intervening at least between said body and said contiguously juxtaposed substantially fixed surface and between said body bore and said received shaft portion for effecting a thin cushioning layer of lubricant therebetween.

15. Apparatus for transmitting motion between an inlet mechanism at which an input force is received and an outlet mechanism at which said received input force is utilized comprising:

an inlet mechanism at which to receive an input force for inducing a motion in response thereto;

an outlet mechanism operatively responsive to motion received from said inlet mechanism;

an intermediate mechanism operable in a path of transmission for transmitting said induced motion from said inlet mechanism to said outlet mechanism and including an arcuately displaceable shaft operably contained in the transmission path of said motion;

a dampener for suppressing undesirable vibration in the motion being transmitted including a body supported on said shaft for displacement and positioned opposite a contiguously juxtaposed substantially fixed surface thereat; and a packing of lubricant of predetermined viscosity positioned selectively intervening at least between said body and said substantially fixed surface for effecting a film-like cushioning layer of lubricant therebetween.

16. In a pressure gauge including a fluid inlet at which to receive fluid of which the value of pressure is to be monitored, a pressure sensitive element responsive to changes in pressure values of the fluid received at said inlet, an indicator supported on an arcuately displaceable shaft and operative by said pressure sensitive element for providing indicia of the value of pressure being received and a housing enclosing said pressure sensitive element and said indicator;

a dampener for suppressing undesirable vibration force in the received fluid from being transmitted to said indicator, said dampener being contained within said housing and comprising;

a body contiguously positioned about said indicator shaft so as to define a thin clearance therebetween; and a packing of lubricant of predetermined viscosity positioned selectively intervening at least in the clearance between said body and said indicator shaft for effecting a thin cushioning layer of lubricant thereat.

17. In an apparatus for effecting displacement between parts in response to a force being transmitted; said apparatus comprising a housing; and a dampener contained within said housing and including:

an operative part arcuately displaceable in response to the force being transmitted;

a fixed surface supported in a contiguously juxtaposed relation to said part so as to define a closely controlled thin clearance spacing therebetween; and a film quantity of lubricant of predetermined viscosity selectively packed into said clearance spacing for suppressing undesirable vibration in the force being transmitted.

18. Apparatus for transmitting motion between an inlet mechanism at which an input force is received and an outlet mechanism at which said received input force is utilized comprising:

an inlet mechanism at which to receive an input force for inducing a motion in response thereto;

an outlet mechanism operatively responsive to motion received from said inlet mechanism;

an intermediate mechanism operable in a path of transmission for transmitting said induced motion from said inlet mechanism to said outlet mechanism and including an arcuately displaceable shaft operably contained in the transmission path of said motion;

a housing enclosing said mechanisms;

a dampener for suppressing undesirable vibration in the motion being transmitted, said dampener being contained within said housing and including a body supported about said shaft and positioned in a contiguously juxtaposed clearance relation thereto; and a packing of lubricant of predetermined viscosity positioned selectively intervening at least between said body and said contiguously juxtaposed substantially fixed surface for effecting a film-like cushioning layer of lubricant therebetween.

* * * * *